United States Patent [19]

Monroe

[11] Patent Number: 6,009,356
[45] Date of Patent: *Dec. 28, 1999

[54] WIRELESS TRANSDUCER DATA CAPTURE AND RETRIEVAL SYSTEM FOR AIRCRAFT

[75] Inventor: David A. Monroe, San Antonio, Tex.

[73] Assignee: Raytheon TI Systems, Lewisville, Tex.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/745,536

[22] Filed: Nov. 12, 1996

Related U.S. Application Data

[63] Continuation-in-part of application No. 08/729,139, Oct. 11, 1996, and a continuation-in-part of application No. 08/738, 487, Oct. 28, 1996, Pat. No. 5,798,458, which is a continuation-in-part of application No. 08/729,139, Oct. 11, 1996.

[51] Int. Cl.$^6$ .................... G06G 7/76; H04N 7/18
[52] U.S. Cl. .................. 701/14; 701/29; 701/35; 701/2; 73/587; 340/439; 340/963
[58] Field of Search ................... 701/3, 14, 15, 701/16, 35, 29, 1, 2; 364/550, 551.01, 580; 340/963, 439, 945, 438, 436; 73/587

[56] References Cited

U.S. PATENT DOCUMENTS

| 5,581,464 | 12/1996 | Woll et al. | 701/35 |
| 5,761,625 | 6/1998 | Honcik et al. | 701/14 |
| 5,778,203 | 7/1998 | Birkedahl et al. | 701/14 |
| 5,798,458 | 8/1998 | Monroe et al. | 701/14 |

Primary Examiner—Jacques H. Louis-Jacques
Attorney, Agent, or Firm—Bracewell & Patterson

[57] ABSTRACT

A wireless safety and surveillance recorder system for aircraft incorporates a plurality of strategically spaced wireless sensors for monitoring critical components and operational characteristics of the aircraft. The captured data and a wireless image are transmitted to a monitor in the cockpit and recorded on a "black box" flight recorder, and may be transmitted to ground control stations for real time or near real time surveillance. The system may include a second recorder for providing redundancy and may include redundant sensors.

22 Claims, 9 Drawing Sheets

WIRELESS TRANSDUCER DATA CAPTURE AND RETRIEVAL SYSTEM FOR AIRCRAFT

CROSS REFERENCE TO RELATED APPLICATIONS

This application is a continuation in part of my application entitled: VIDEO AND DATA CAPTURE AND RETRIEVAL SURVEILLANCE SYSTEM FOR AIRCRAFT, Ser. No. 08/729,139, filed on Oct. 11, 1996, now pending and is directly related to my appliction entitled: ACOUSTIC CATASTROPHIC EVENT DETECTION AND DATA CAPTURE AND RETRIEVAL SYSTEM FOR AIRCRAFT, Ser. No. 08/738,487, filed on Oct. 28, 1996, now U.S. Pat. No. 5,798,458, which is also a continuation in part of application Ser. No. 08/729,139 Oct. 11, 1996.

BACKGROUND OF INVENTION

1. Field of Invention

The subject invention is generally related to safety and surveillance equipment for aircraft and is specifically directed to a wireless data collection and transmission system for commercial aircraft.

2. Discussion of the Prior Art

Aircraft safety is of ever increasing importance. This is particularly true with respect to commercial airlines as more and more people and freight are moved in this manner. The airways are becoming increasingly crowded with traffic. While air travel is still the safest form of transportation, if the present growth rate continues there will be a fatal accident involving aircraft on a daily basis within the next decade. Therefore, not only is it of critical importance that additional safety precautions be devised and adapted but also that better and more efficient accident reconstruction methods be developed, as well. The effort to reconstruct the cause of the fatal crash of TWA Flight 800 in July, 1996 has exceeded $25,000,000.00.

Electronic systems have already greatly enhanced the safety record of commercial aircraft. Global tracking systems are now in place to monitor the flight of the aircraft from its destination. Radar and global positioning systems are commonplace. All of these electronic systems have increased the ability to track the performance of an aircraft frame the moment it lifts off until it safely lands.

In addition, the on board avionics including electronic monitoring and diagnostic equipment, particularly on large commercial jets, continues to evolve, giving both the on board crew and the tracking station more complete, accurate and up-to-date information regarding the condition of the aircraft while in flight.

Flight recorders long have been incorporated in order to provide a record of each flight and in order to provide critical information to aid in the determination of the causes of an accident or malfunction should one occur. In the prior art systems transducers, sensors and other monitoring equipment, such as by way of example, pressure gauges, temperature sensors and the like are positioned at strategic locations throughout the aircraft for monitoring the operation of these components. The transducers, sensors and other monitoring equipment are hardwired to the on board "black box" data recorders and to various monitoring equipment in the cockpit. While the data collected and transmitted by this equipment provides useful real-time information to the flight crew and is useful in reconstructing the cause and effect of catastrophic incidents, the systems of the prior art have shortcomings reducing the effectiveness of the data.

Typically, the hardwired systems of the prior art will stop collecting data once there has been a structural failure of the airframe or a disruption in aircraft power. This is because the transmission lines of the hardwired system are interrupted, or the power system is either interrupted or the aircraft power source ceases to operate. This precludes the collection and transmission of critical data at the very moment when it is most critical, i.e., at the moment when a catastrophic event occurs.

Therefore, it would be desirable to have a data collection and retrieval system that would continue to monitor and collect data after a power interruption or other catastrophic failure. Further it would be desirable to have redundant recordings of the critical data and redundant monitors and capture as well. While such a system would be of great benefit to the airline industry in general and to the commercial airlines in particular, there are no systems currently available which meet these needs.

SUMMARY OF THE INVENTION

The subject invention is specifically directed to a wireless data generation, transmission and collection system wherein the critical data generated by the monitoring equipment on board an aircraft may be displayed on cockpit monitors and recorded through wireless transmission. The preferred embodiment of the invention includes a plurality of redundant "black box" data recorders. The transducers, sensors and other monitoring equipment of the system, as well as the recorders and, where desired, the monitors, are all self-contained with independent power supply systems whereby the overall system continues to generate, collect, transmit, display and record data even after an airframe structural failure or other catastrophic event.

The wireless system of the subject invention has the advantage of reducing the weight of the surveillance and safety system by eliminating wiring harnesses and the like. Due to the wireless configuration of the system, it can be readily retrofitted in existing equipment with a minimum of difficulty. Further, the addition of the wireless system of the invention to existing equipment will provide additional redundancy to many of the hardwired monitoring components currently in place.

The wireless system of the subject invention is configured to be a stand alone system for monitoring, collecting, displaying and recording critical data. As stated, it can also be used in combination with the prior art hardwired systems to provide a redundant system. Further, the wireless system of the subject invention can be used in combination with my aforementioned copending applications entitled: VIDEO AND DATA CAPTURE AND RETRIEVAL SURVEILLANCE SYSTEM FOR AIRCRAFT, Ser. No. 08/729,139, filed on Oct. 11, 1996 and ACOUSTIC CATASTROPHIC EVENT DETECTION AND DATA CAPTURE AND RETRIEVAL SYSTEM FOR AIRCRAFT, Ser. No. 08/738,487,filed on October, 1996, now U.S. Pat. No. 5,798,458 incorporated by reference herein, to provide a comprehensive multi-media safety and surveillance system, as therein described. The multi-media sytem provides both visual and audio information as well as critical data to the flight crew, and to a ground tracking station, and also permits recording the information and data generated during flight.

In its preferred form, a plurality of sensor units are placed strategically throughout the aircraft. The data sensors/transducers, such as by way of example, the engine temperature sensor, oil pressure and hydraulic pressure sensors and strain gauges and the like generate critical performance data which is transmitted to a cockpit monitor for use by the flight crew and to one or more "black box" recorders for recording the data to aid in reconstruction of a catastrophic event, performance history or the like.

The wireless system provides assurances against disruption of data transmission and collection during a catastrophic airframe failure. In the preferred embodiment, the wireless system is fully self-contained with each sensor unit having an independent power supply.

In the preferred embodiment, the monitoring and recording systems for collecting and transmitting the data are also self-contained. This assures that the entire collection, transmission, display and recording system will continue to operate in the event of either a malfunction or a structural failure of the aircraft causing a disruption in aircraft power.

Typically the data is transmitted to a monitor provided on the flight deck and to a "black box" recorder which may be placed in the tail section, as is common for flight data and voice recorders currently in use. In the preferred embodiment, dual recorders are provided to provide redundancy. For example, one recorder may be installed in the nose section and a second in the tail section to better assure that the recorded data may be retrieved in the event of a catastrophic event. The flight deck has instant real time access to all of the data being collected and the recorders provide an historic record for archive purposes.

Where random access recording techniques are used, such as, by way of example, digital memory storage devices, the flight deck and the ground station personnel may also be able to search and retrieve stored information. For example, current hydraulic pressure of a component may be compared with the pressure of a past point in time to monitor rate of change.

That is, the ground tracking station will have the capability of interrogating the in flight data while the aircraft is in flight. Near real time data can be received and historical data can be retrieved, as well, when the random access storage device is utilized.

The plurality of sensors may be synchronized through an on board multiplexing system. In the preferred embodiment, the system is adapted for incorporating the data signal generated by the aircraft navigational data such as that provided by an inerntial navigation system or global positioning system (GPS) for tracking the altitude, latitude and longitude coordinates synchronized with the collected data in order to provide accurate information of where the aircraft is in its flight plan when an incident occurs. A time or chronology signal may also be incorporated in the data scheme. Any signal which is capable of being captured and stored may be monitored in this manner. By tying each of the signals to a reference such as the GPS signal or a clock, the retrieval of data and reconstruction of an on board incident is facilitated.

Preferably, the entire capture, retrieval, monitor and archive system is installed utilizing a wireless transmitting/receiving system in order to assure that transmission will not be lost in the event of a power shutdown or a structural failure causing possible open circuit conditions which could occur in a hard wired system. In the preferred embodiment, such a system would be completely self-contained with an integrated power supply and an integrated illumination system.

It is, therefore, an object and feature of the subject invention to provide a wireless data monitoring, collecting, displaying, transmitting, receiving and storage safety and surveillance scheme for aircraft.

It is another object and feature of the subject invention to provide a fully integrated, self-contained power supply system for powering the data system of the subject invention in the event of a airframe structural failure and/or a disruption in aircraft power, whereby the data can continue to be collected and recorded after the occurrence of such an event.

It is an additional object and feature of the subject invention to provide a record of critical components and areas of an aircraft during flight for archival and retrieval purposes.

It is yet another object and feature of the subject invention to provide apparatus for permitting ground personnel to receive data relating to critical components and areas of and aircraft during flight.

It is an additional object and feature of the invention to provide real time data monitoring the various systems and components of an aircraft using a wireless transmission system.

It is also an object and feature of the invention to providing historical data both before and after an event in order to enhance reconstruction.

It is a further object and feature of the subject invention to provide accurate information of where the aircraft is during a flight path when specific data is generated and transmitted.

It is also an object and feature of the subject invention to provide a system for linking recorded data with an inertial navigation system or other navigational data source such as, by way of example, a global positioning system for archival purposes.

It is still another object and feature of the invention to permit the monitoring, storing and retrieval of any of a variety of data by the tracking, surveillance and imaging equipment on board the aircraft.

Other objects and features of the subject invention will be readily apparent from the accompanying drawings and detailed description of the preferred embodiments.

DETAILED DESCRIPTION OF THE PREFERRED EMBODIMENTS

Figure 1:
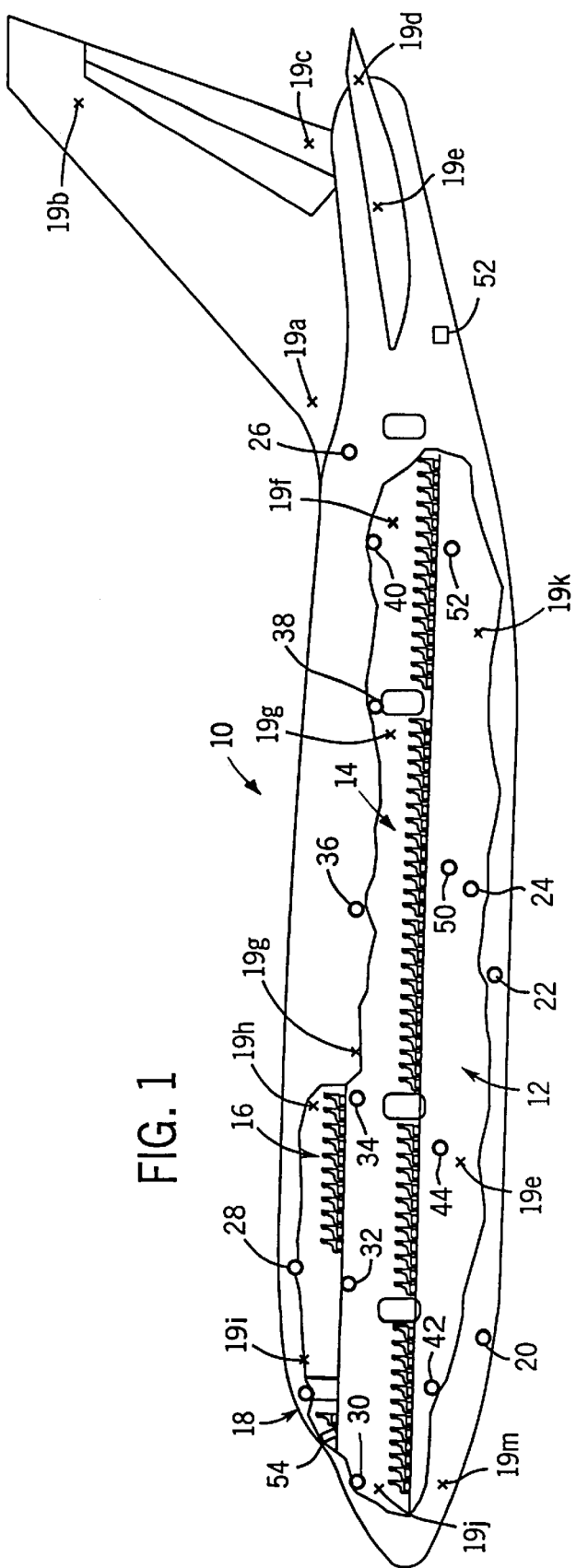
FIG. 1 is a cutaway illustration of the fuselage of an aircraft showing exemplary placement various sensors, transducers and monitors throughout the aircraft in accordance with the invention.

FIG. 1 shows a cutaway diagram of a typical commercial airline fuselage 10, with the cargo hold 12, the passenger cabins 14, 16 and the flight deck or cockpit 18 partially visible. A plurality of sensors, transducers, and other monitoring equipment are strategically placed throughout the aircraft as diagrammatically illustrated by the sensors 19*a–m*. These include strain gauges, engine temperature sensors, hydraulic pressure gauges and the like, as generally well known by those who are of ordinary skill in the art. The placement and number of devices is a matter of choice depending upon the configuration of the system.

In the embodiment shown and described, a "black box" data recorder 52 is installed in the tail section of the aircraft, in the same manner as the current flight data and cockpit voice recorder "black boxes" (not shown). In the preferred embodiment, a redundant "black box" data recorder 53 is also installed in the nose section of the aircraft. A flight deck monitor 55 and control panel 54 is located on the control panel in the cockpit 18. Other monitors may be provided where desired. While the system of the subject invention is specifically designed to operate as a stand alone system, it is also adapted to be used in combination with the multi-media systems described in my aforementioned applications. When used is such a combination, the system may include video cameras 20, 22, 24, 26, 28, 30, 32, 34, 36, 38, 40, 42, 44, 48 and 50. This combination system is more fully described in those applications and is shown and described later herein with specific reference to FIG. 9.

Figure 2:
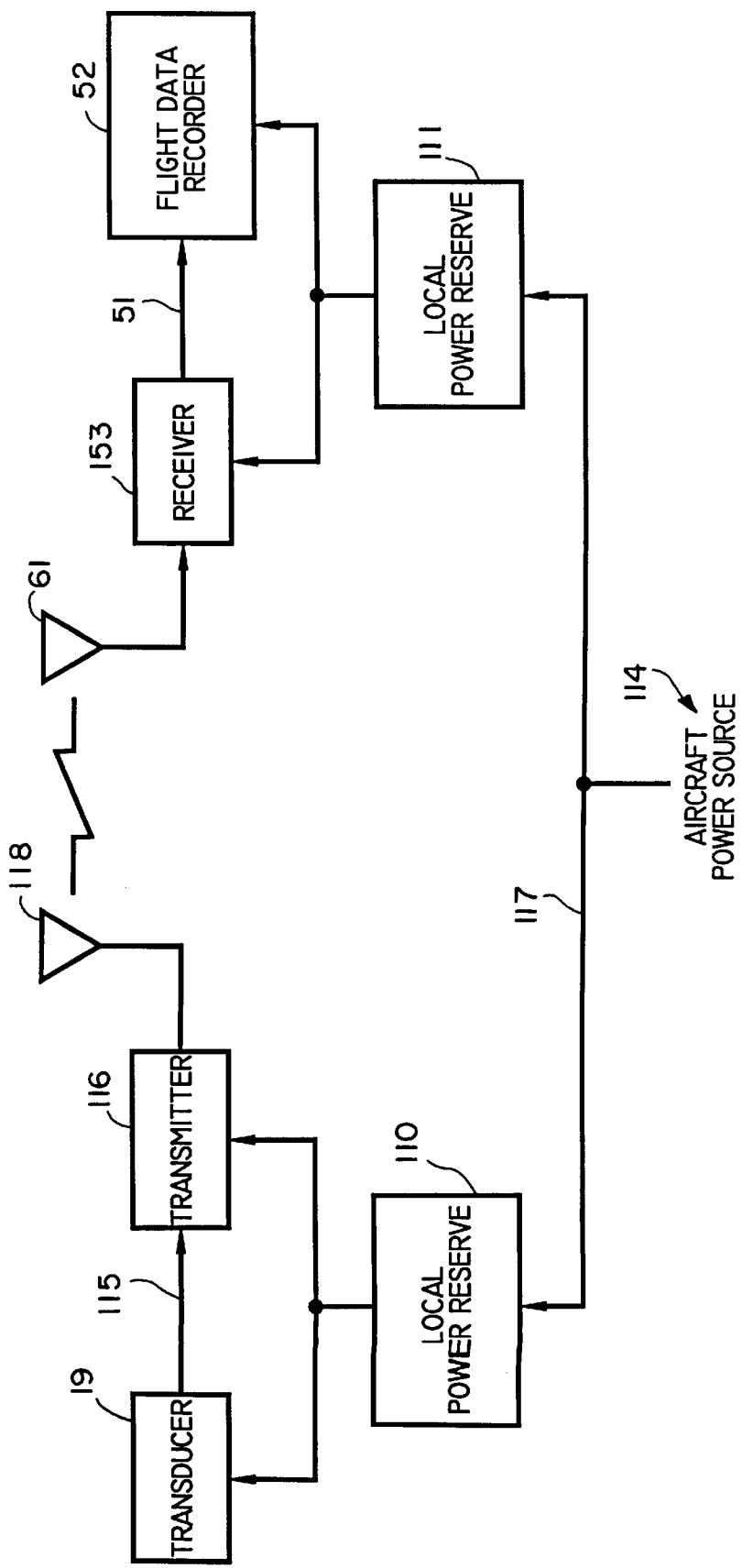
FIG. 2 is a block diagram of a wireless system in accordance with the subject invention

Turning now to FIG. 2, it will be noted that each of the transducers or sensors 19 is specifically adapted to monitor a critical function and is intended to be a discrete, stand alone unit. In the preferred embodiment, transducer will produce an output signal on the associated output line 115 which is introduced to a transmitter 116 for output to antenna 118 for generating a radio signal. A local reserve power supply 110 is provided. This is typically a rechargeable supply such as a capacitor system, a rechargeable battery, or the like. Typically, the rechargeable power supply 110 will be coupled directly to the aircraft power source 114, as indicated at 117. In most applications it is only necessary that the reserve power be sufficient to power the transmitter and the transducer for at most a few minutes after aircraft power shutdown. Therefore, the reserve power system may be minimized in both size and weight requirements. Also, it should be understood that certain mechanical transducers may not require power, in which case the reserve power source would only be utilized to power the transmitter 116.

The receiver/recording system for the subject invention includes at least crash hardened one "black box" data recorder 52 adapted for receiving incoming data on line 51 received from the receiver 153 via the antenna 61. The recording system including the receiver and the recorder are also supplied with a reserve power supply 111 which is coupled to the aircraft power source as previously explained.

Figure 3:
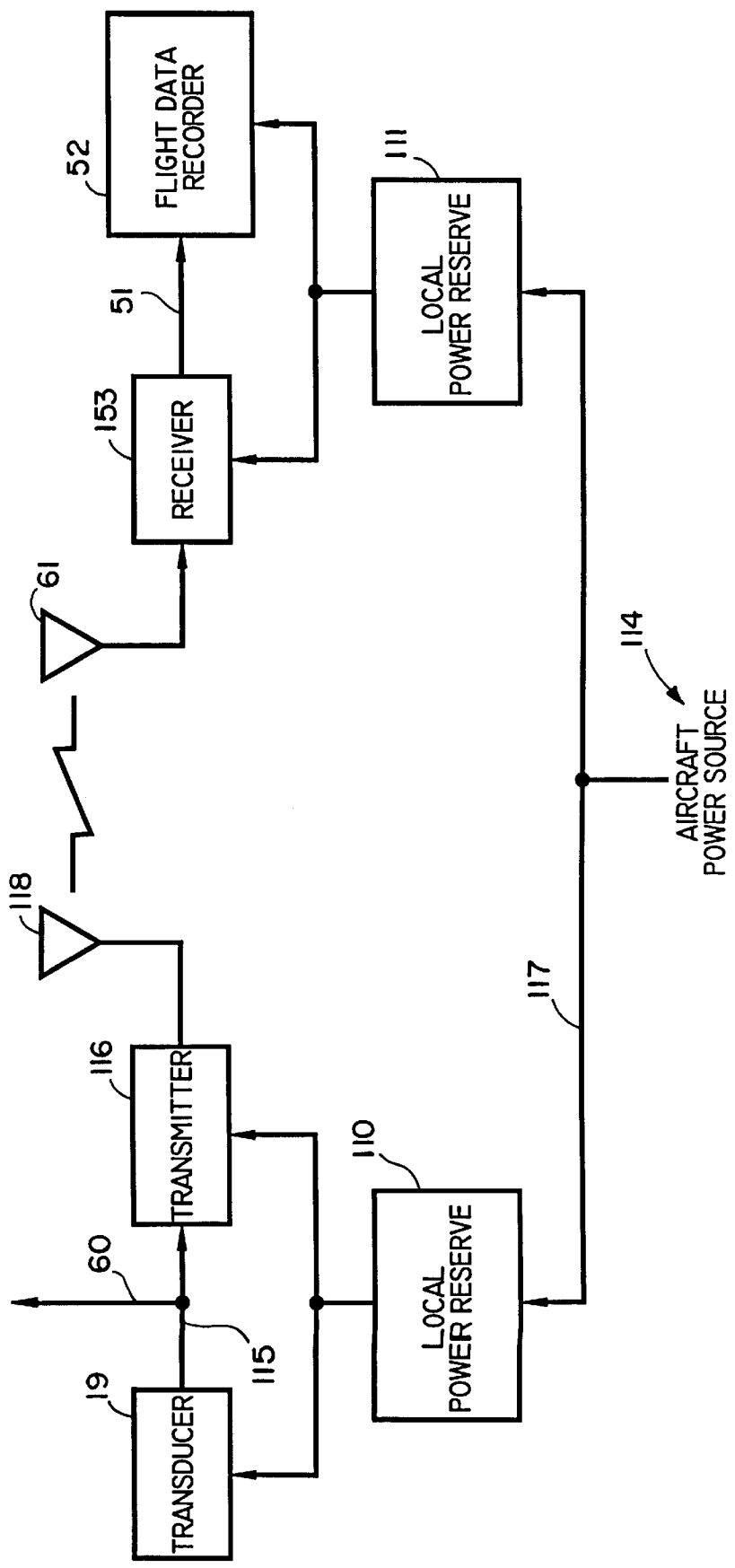
FIG. 3 is a block diagram similar to FIG. 2, showing a hardwired monitor in combination with the system.

A modification of the system of FIG. 2 is shown in FIG. 3. As there shown, the signal on line 115 from the transducer 19 may be introduced directly to a cockpit display or monitor 55 via line 60. That is, the transducer may be hardwired directly to the monitor as in prior art systems.

Figure 4:
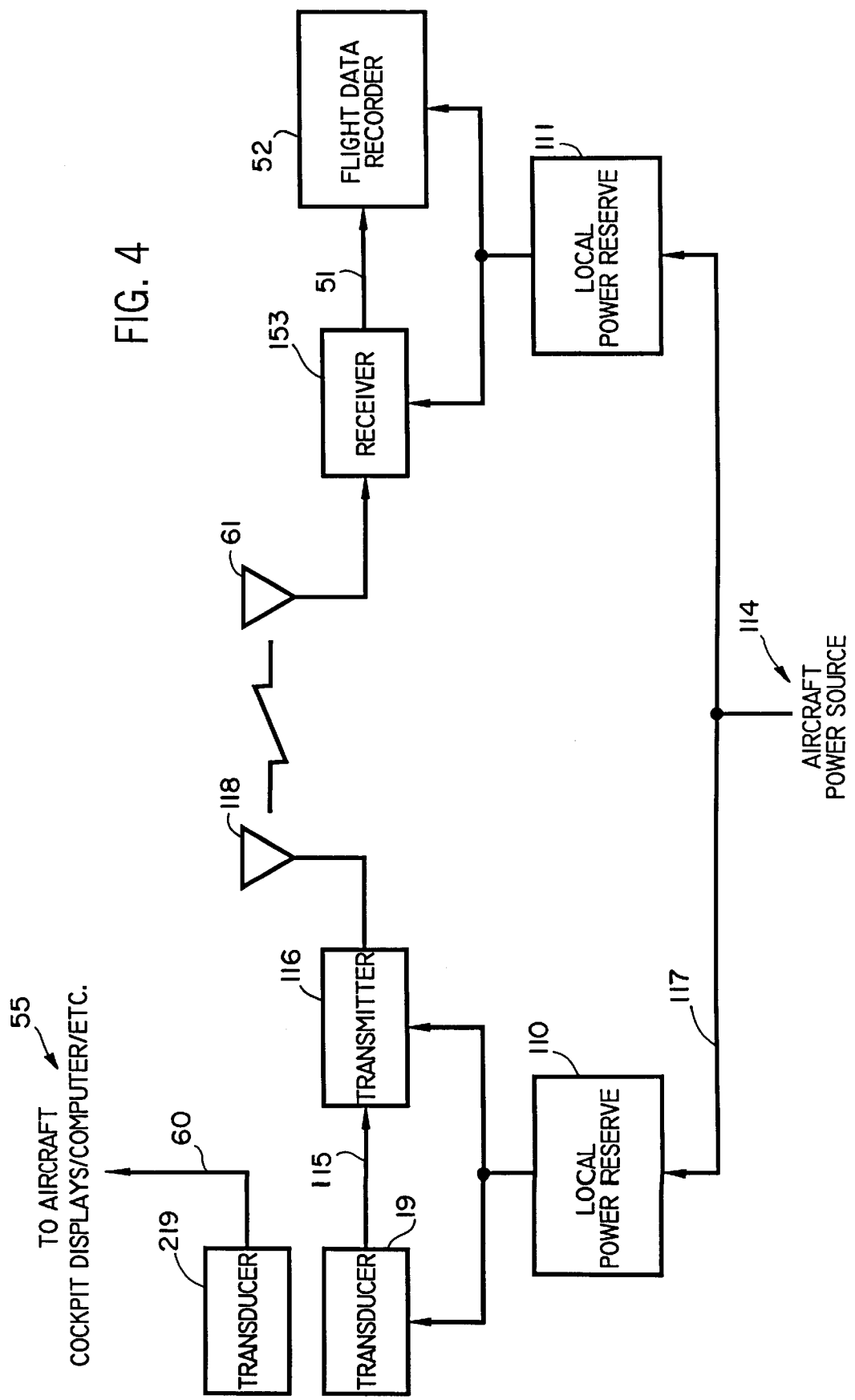
FIG. 4 is a block diagram of a system incorporating the features of the wireless system of FIG. 2 in combination with a hardwired system to provide redundancy.

A further modification is illustrated in FIG. 4, wherein the wireless system of the subject invention is shown used in tandem with a hardwired transducer to provide a redundant system. In the embodiment shown, the hardwired transducer 219 provides the input to the monitor 55. This type of configuration is particularly well suited for retrofit applications where the hardwired system is already in place. The self contained, reserve power sensors/transducers of the subject invention may be incorporated directly into an existing system without modifying any of the original hardwired components. The transmitter is then used to transmit the information directly to the wireless stand alone recorder 52, as previously described. In this embodiment, the hardwired recorder (not shown) generally associated with the hardwired transducer need not be removed, although typically it becomes unnecessary.

Figure 5:
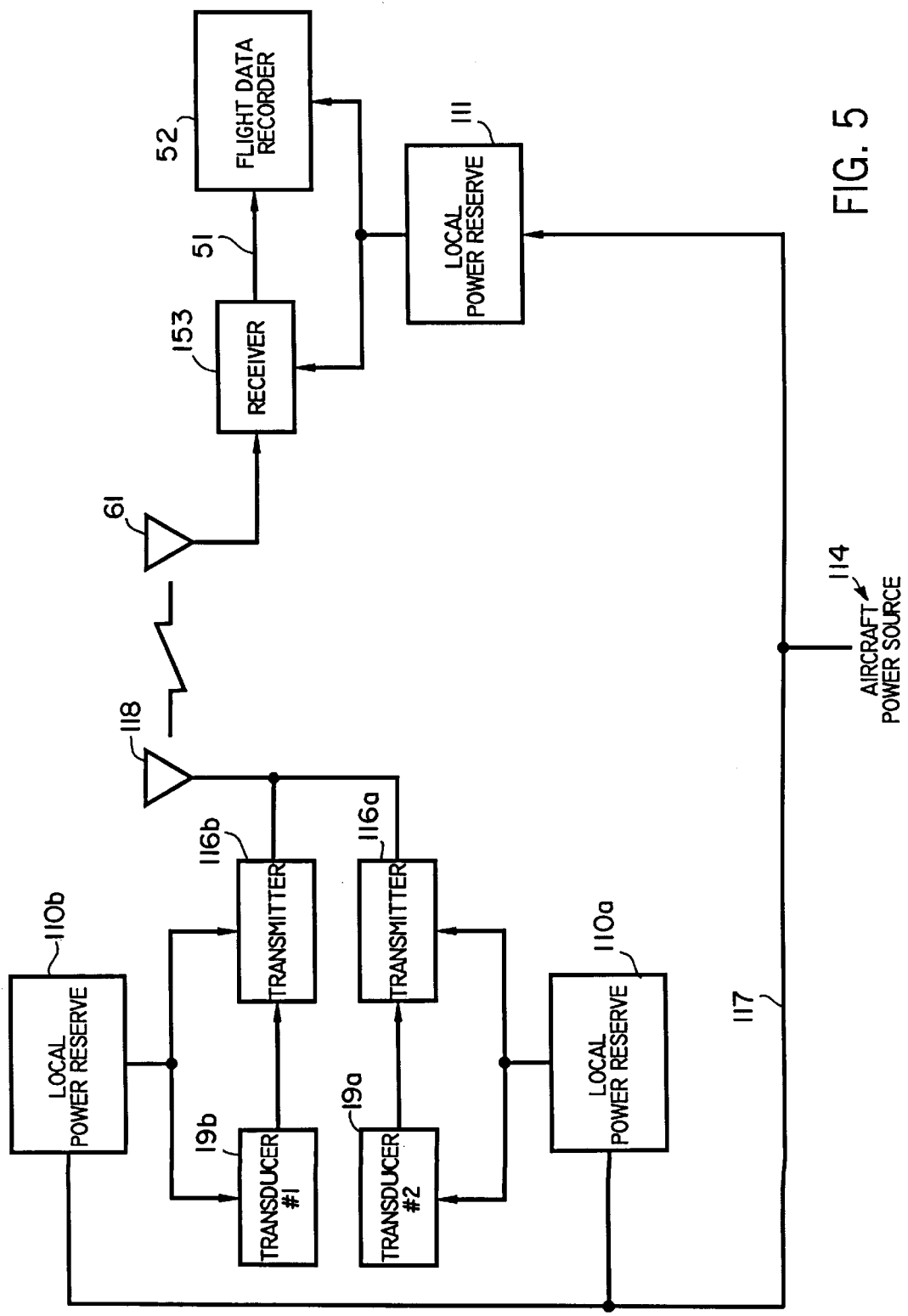
FIG. 5 is a block diagram of a wireless redundant system.

A redundant wireless system is shown in FIG. 5. In this configuration dual transducers 19*a* and 19*b* monitor the same component or function, with duplicate systems providing input to the transmitting antenna 118. The recording system portion of this embodiment operates as previously described, utilizing antenna 61 as the receiving antenna. This provides transducer and transmitter redundancy for fail safe operation.

Figure 6:
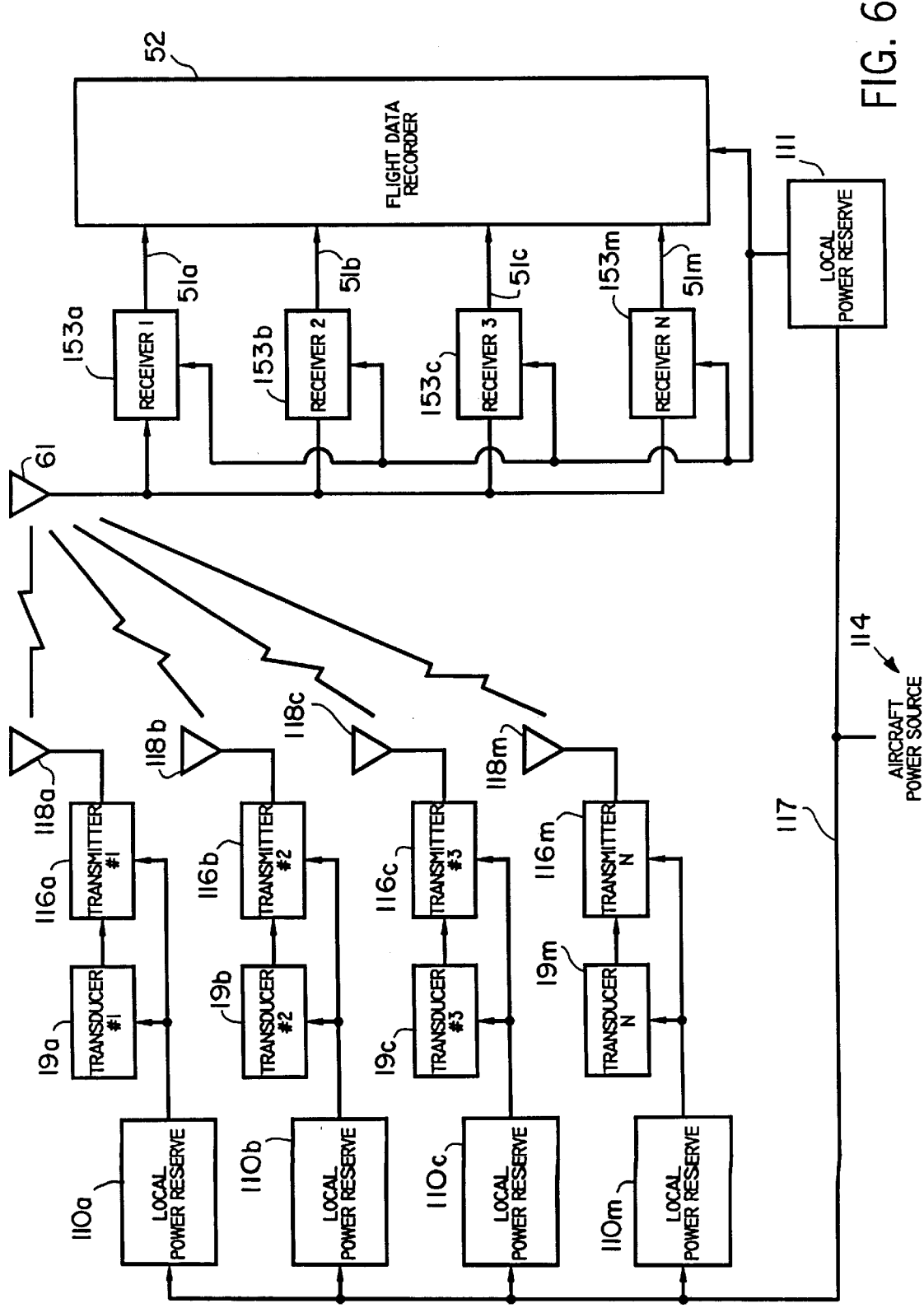
FIG. 6 is a block diagram incorporating the teaching of the invention in a multiple sensor device.

Each of the embodiments of FIGS. 2–5 are designed to be utilized in a multiple sensor system, as shown in FIG. 6, wherein the various transducers or sensors 19*a–m*, as exemplified in FIG. 1 are incorporated into a comprehensive monitoring and recording system. Each transducer 19*a–m* includes a dedicated transmitter 116*a–m* for producing an output signal at the dedicated antenna 118*a–m*. Each transducer system also includes a dedicated, stand alone reserve power system 110*a–m* for powering the respective transmitter and the respective transducer where required.

Figure 7:
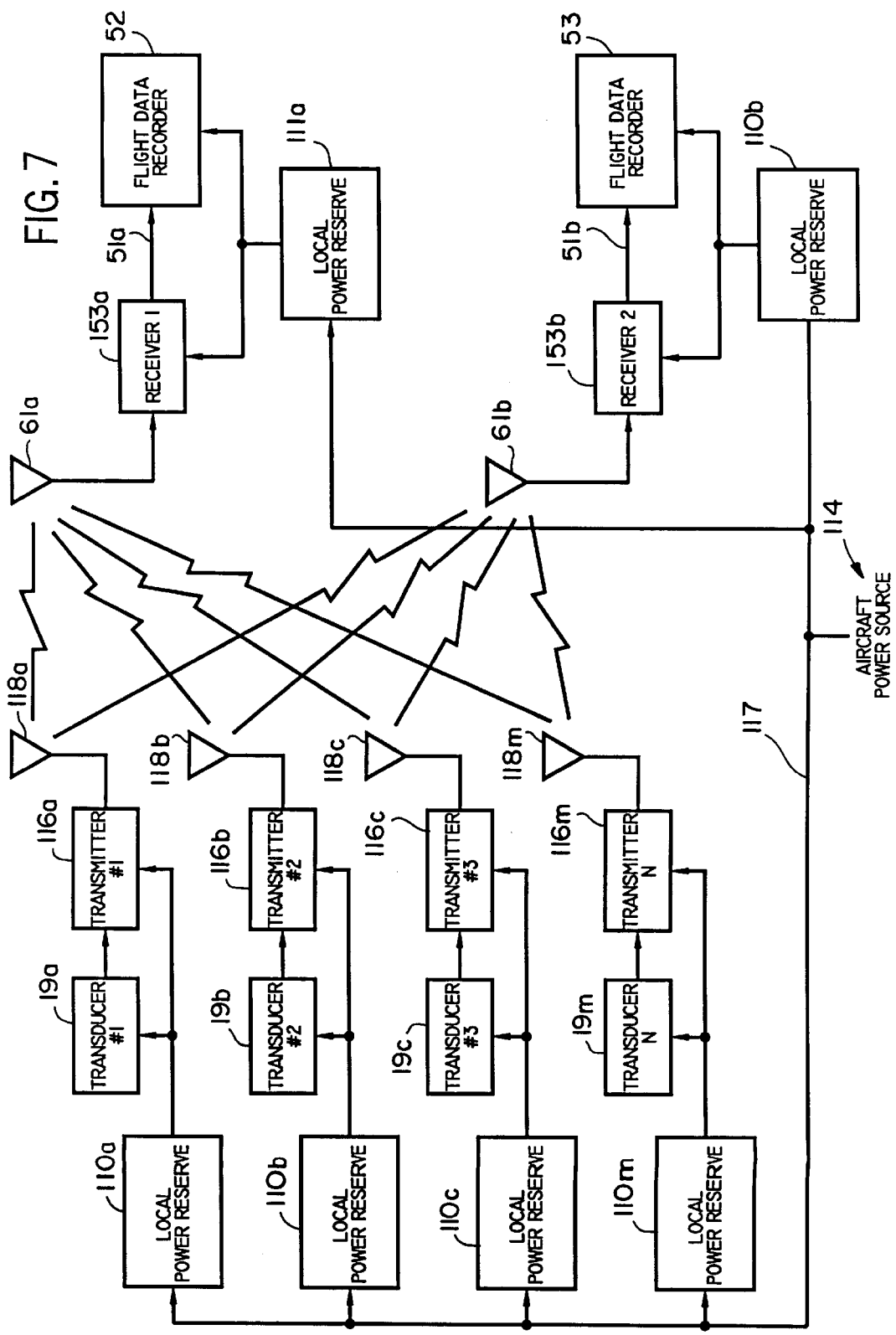
FIG. 7 is a an expansion of the block diagram of FIG. 7, illustrating redundant recording systems.

A dedicated receiver 153*a–m* is associated with each transducer 19*a–m* for receiving the signal and introducing it into the flight data recorder 52. Typically each transducer and each mated receiver will send and receive on a dedicated radio frequency for maintaining the distinctive signals from each transducer.

Where redundant recorders 52 and 53 are utilized. The recorder system is duplicated as shown in FIG. 7. Specifically, once a signal is generated by the various transmitters 116*a–m*, the signal can be received by any antenna 61*a*/61*b* positioned anywhere in the aircraft. This permits the placement of redundant recorders at various points in the aircraft for better assuring retrieval in the event of a catastrophic event. By using the wireless system, the placement and number of recorders is not limited by the difficulty in stringing wires or by the added weight from the wiring systems. This greatly enhances both the versatility and the dependability of the system.

Figure 8:
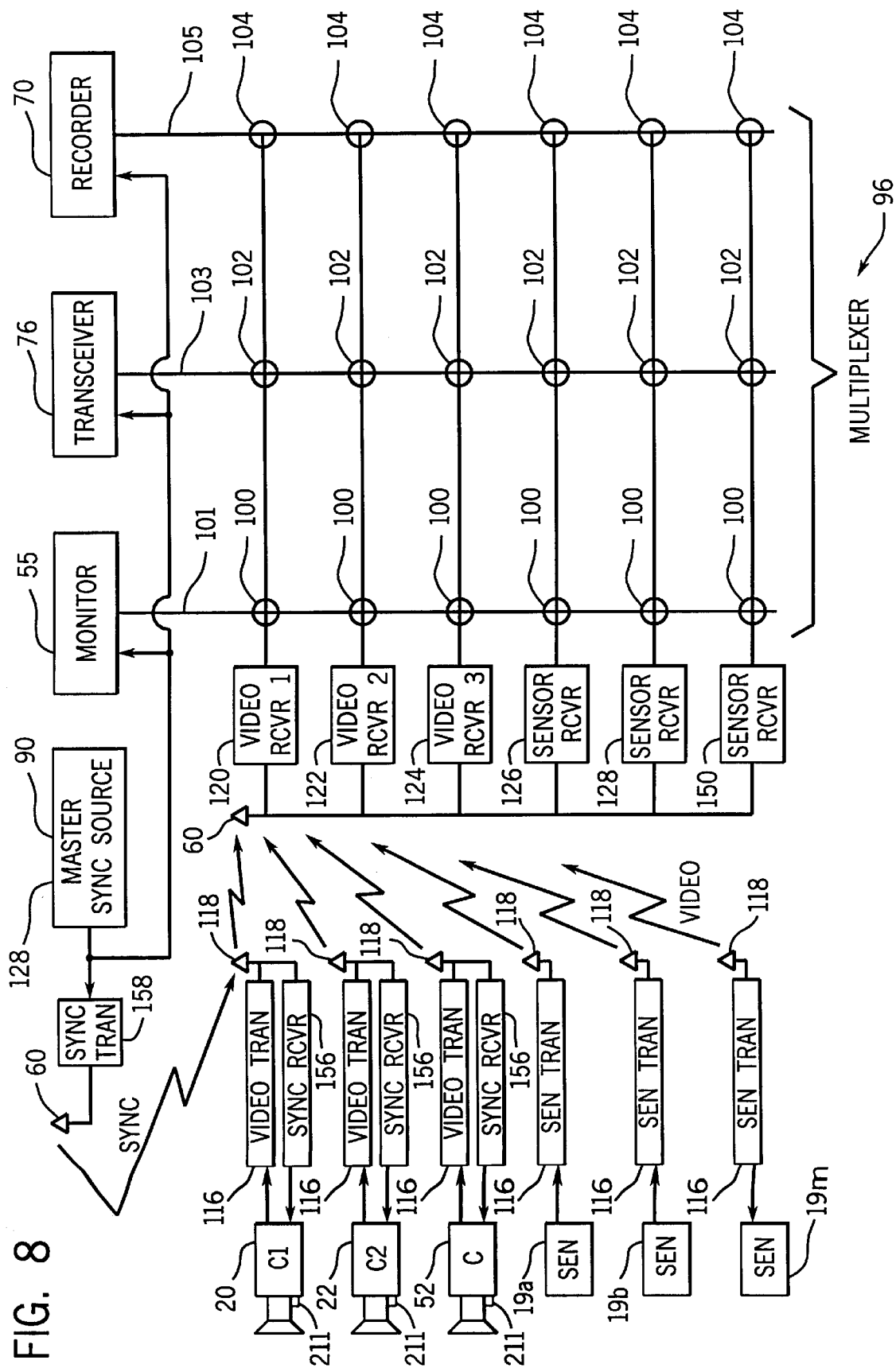
FIG. 8 is a block diagram showing the system of the subject invention in combination with a multi-media system.

As previously stated the system of the subject invention may be used in combination with a comprehensive multi-media system as described in more detail in my aforementioned applications. An exemplary embodiment is shown in FIG. 8. As there shown, each of the various cameras C will be mounted at the desired site and will include also a self-contained power supply 110. This provides a fully integrated system which is operational even in the event of airframe failure or shut down of the aircraft power supply and backup systems. In the preferred embodiment, each camera unit will include an illuminating source such as, by way of example, the light source 211, which will be operational during a power failure mode, or selectively operational during certain operating modes. For example, the cargo bay camera illumination system would be operational even if all other aircraft power had failed. Other systems such as infrared sensor systems can also be incorporated to provide adequate image capturing techniques. The camera system also includes the self-contained transmitter 116 and an antenna 118 for transmitting the captured video signal via a dedicated low interference radio frequency. Each signal is received by an antenna 60 and deciphered by matching receivers 120, 122, 124, 126 . . . 150, in one-to-one correspondence with the cameras 20, 22, 26 . . . 50, to provide a unique video signal on each of the lines 94 as previously described, for providing input into the switching matrix 96 of the receiver/processing network. The receiver/processor network also include a dedicated, self contained power supply as indicated by the rechargeable power supply we previously described.

Where a synchronized system is used in a wireless multiple camera installation, numerous synchronizing techniques may be utilized. For example, the wires may be synched, or the unsynchronized video signal may be transmitted and then resynchronized utilizing digital techniques, or as illustrated here, where the synch signal is transmitted. Specifically, each camera C will include a self-contained synchronizing signal receiver 156 in addition to the transmitter 116 and the power supply. This receiver can also be used as an on-off/switching device for the cameras and could be set up as a wireless multiplexer by switching cameras. The antenna 118 will be used for both transmitting the video signal and receiving the sync signal. As diagrammatically shown in FIG. 8, the receiver/processing system is modified to include a master synchronizing signal source 90, see FIG. 3 and a transmitter 158 coupled to the antenna 60. The various function sensors 19*a–m* of the subject invention are incorporated in the multi-media system and operate in the manner described. Additional multi-media sensors may be incorporated in the system, as well, and may be wireless or hard wired as appropriate.

All of the data, including all video, audio and digital data will be recorded on the "black box" data recorder system 70. The combined, comprehensive output signal may also be downlinked to the ground tracking station, as described in my aforementioned copending applications.

Figure 9:
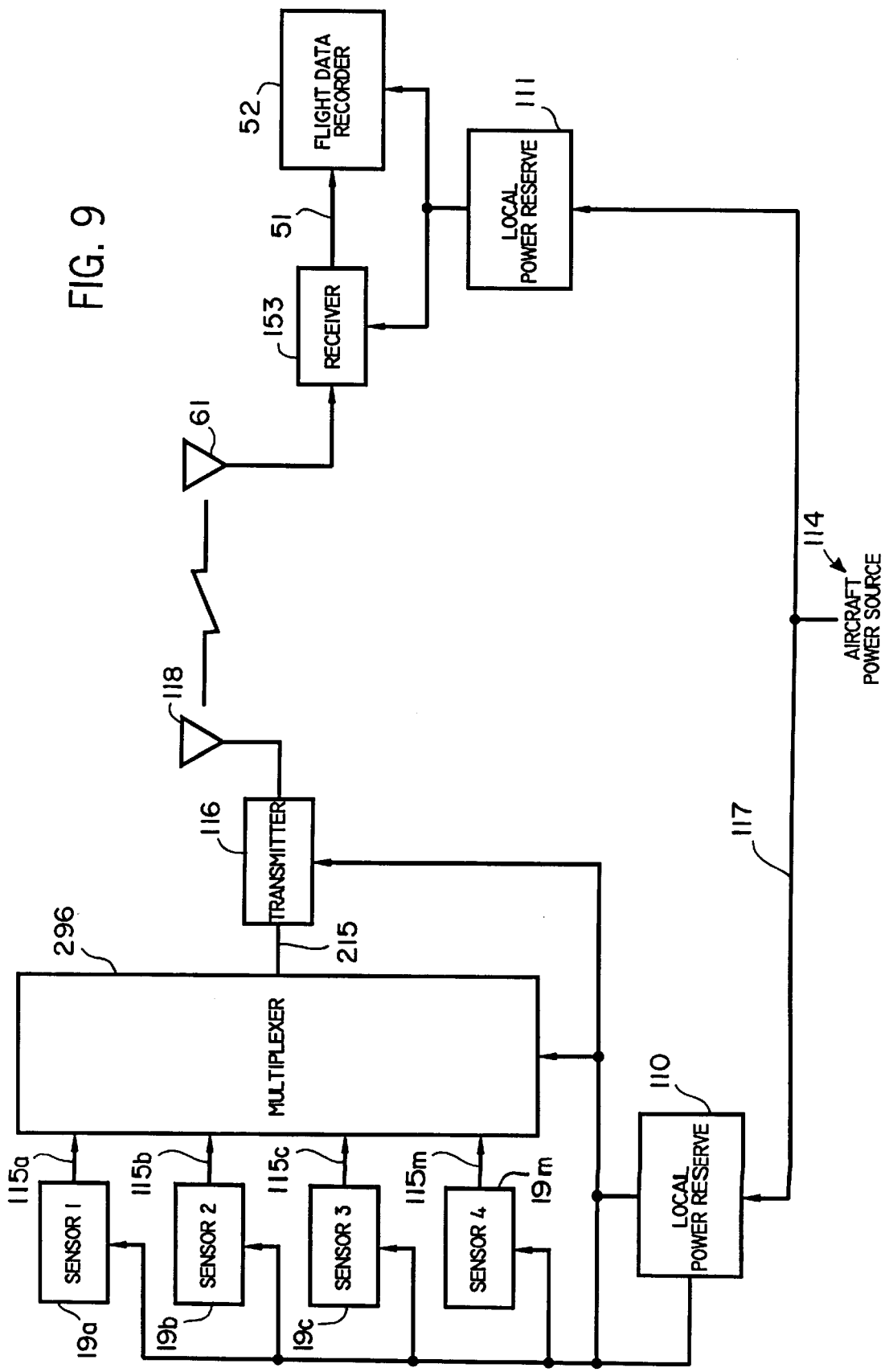
FIG. 9 is a block diagram illustrating the use of a multiplexer in combination with close proximity sensors prior to transmission via a wireless system.

FIG. 9 is an illustration of a system incorporating a multiplexer 296 positioned between an array of close proximity sensors 19*a*. . . 19*m*. This permits all of the output signals 115*a* . . . 115*m* to be combined into a single combined output signal 215 before the signal is transmitted to the receiver system. This would be particularly useful for sensors in close proximity such as, by way of example, the complete array of sensors associated with a single engine. This would reduce the overall amount of hardware required by incorporating the individual signal on lines 115*a*. . . 115*m* into a single combined engine data signal on line 45, permitting transmission via a single transmitter 116.

It will be understood that the wireless configuration can be readily adapted to any component of the system once the various data signal are available as radio frequency transmissions. Therefore, it may be desirable to use wireless monitors, downlinking systems and other components as well to both reduce dependency on wired systems which may fail and to further reduce the complexity of the installation process.

Any of a variety of recording devices and systems may be utilized. In addition to the well-known and highly utilized analog recording systems, it is desirable to utilize a digital data recorder system in many instances to permit global searching and downloading capability.

The video recorders, synchronizing networks and multiplexing hardware are well known and their adaptation will be readily apparent to those of ordinary skill in the art. Any suitable recording format can be used, for example, an analog tape recorder, a digitizer and digital tape or hard drive/optical drive configuration, or a digitizer, compressor, digital tape or hard drive/optical drive configuration. Digital cameras could be incorporated in lieu of the standard analog type cameras currently in use in most applications. As digital technology becomes more readily available and more cost effective, it is contemplated that most of the sensor, monitoring and-recording equipment will be of a digital format because of the increased reliability and the minimized space requirements. Of course, it should also be understood that the monitoring, transmitting and storage capabilities of the invention are also well suited for capturing any data generated by the on board avionics of the aircraft. For example, the subject invention will accommodate the recording and transmission of radar imaging as displayed on a monitor in the cockpit. This will provide an accurate record of the radar image at the time of a catastrophic occurrence, and/or will permit downlinking of the on board radar signal to the ground crew. The system of the present invention greatly increases the information available to the flight crew during flight, enhances the historical log of the flight as recorded in the on board "black box" recorders, and gives the ground tracking crew access to real time information at any time during the flight of the aircraft.

The wireless data recording system of the subject invention provides an enhanced in flight safety scheme giving instantaneous and live image access to critical components and areas of an aircraft, providing the flight crew with additional information while the aircraft is airborne. In addition, the permanent tape record will prove invaluable for investigating the causes of an in flight catastrophe or malfunction. The system is specifically designed for new commercial aircraft but is equally well-suited for retrofit understood that the invention encompasses all modifications and enhancements within the scope and spirit of the following claims.

What is claimed is:

1. A wireless data collection and transmission system for monitoring extraneous occurrences on board an aircraft in order to permit reconstruction of a catastrophic event whether or not the aircraft stays intact throughout the event, the system providing in flight data monitor, collection, display and recording of audio and visual information, the system comprising:

a. a plurality of event sensors positioned at strategic locations about the aircraft, each adapted for monitoring a selected condition aboard the aircraft, each said sensor adapted for generating a unique data signal representing a specific condition to be monitored;

b. an integrated, dedicated power supply associated with each sensor, whereby each said sensor will continue generating said unique data signal when disconnected from aircraft power;

c. a wireless transmitter adapted for transmitting the unique data signal from each said sensor;

d. a wireless receiver located on the aircraft for receiving and processing each of the plurality of unique signals, whereby each said sensor will continue to transmit the unique data signal in the event the monitored location is separated from a portion of the aircraft wherein the wireless receiver is located.

2. The system of claim 1, wherein one of said data signals is an analog data signal and wherein one of said data signals is a digital data signal, the receiver system further including an analog to digital converter for converting the analog data signal into a converted digital data signal, the multiplexer subsystem adapted for multiplexing the converted digital data signal and the digital data signal into a combined digital data signal.

3. The system of claim 1, wherein one of said data signals is an analog data signal and wherein one of said data signals is a digital data signal, the receiver system further including a digital to analog converter for converting the digital data signal into a converted analog data signal, the multiplexer subsystem adapted for multiplexing the converted digital data signal and the analog data signal into a combined analog data signal.

4. The system of claim 1, the aircraft including a plurality of engines, and the data sensor devices including an array of performance sensors associated with each engine and a local engine multiplexer subsystem associated with each array of performance sensors for producing a combined engine performance data signal for each engine.

5. The system of claim 1, wherein the receiver system further includes a monitor for displaying the processed signal.

6. The system of claim 1, wherein the receiver system further includes a recorder for capturing the processed output signal in a retrievable format.

7. The system of claim 6, wherein the recorder is a single-channel analog recorder.

8. The system of claim 6, wherein the recorder is a digital memory device.

9. The system of claim 1, wherein the receiver system further includes an additional transmitter adapted for wireless transmission of the data signal to a remote location, whereby the data output signal may be downloaded from the system.

10. The system of claim 9, wherein the system further includes a receiver adapted for receiving wireless transmission of uploaded data signals from a remote location, whereby an uploaded data signal may be uploaded onto the system from a remote location.

11. The system of claim 1, further including traditional sensors in combination with the wireless sensors.

12. The system of claim 1, wherein said wireless sensors are adapted for transmitting the data signal to the receiver system via wireless radio frequency transmission.

13. The system of claim 12, wherein each wireless sensor includes a transmitter for generating a data signal to be transmitted and the receiver system includes a receiver device for accepting the transmitted data signal.

14. The system of claim 1, wherein each sensor includes a transmitter for generating a data signal on a unique frequency and wherein the receiver system comprises a dedicated receiver for each of the plurality of transmitted data signals.

15. The system of claim 14, further including means for multiplexing the plurality of transmitted data signals for generating a combination data signal incorporating all of said plurality of data signals.

16. The system of claim 14 further including a single receiver system adapted for receiving the plurality of transmitted data signals.

17. The system of claim 1, said receiver system further including a self-contained power supply.

18. The system of claim 1, further including the wireless sensors each adapted for monitoring a selected condition on board the aircraft, each sensor adapted for generating a unique data signal representing the specific condition to be monitored, and wherein said receiver system is adapted for receiving the plurality of data signals from the plurality of sensors and for combining said data signals for producing a combined output signal.

19. The system of claim 1, further including a second receiver system independent of said first mentioned receiver system for providing redundancy.

20. The system of claim 1, further including a second plurality of wireless sensors in parallel with said first mentioned plurality of wireless sensors for providing redundancy.

21. The system of claim 1, further including a monitor hardwired to said plurality of sensors.

22. The system of claim 1, further including a monitor having a receiver for receiving the data transmitted by the transmitter.

* * * * *